United States Patent

[11] 3,582,781

| [72] | Inventor | Saburo Uemura<br>Kanagawa-ken, Japan |
| --- | --- | --- |
| [21] | Appl. No. | 837,016 |
| [22] | Filed | June 27, 1969 |
| [45] | Patented | June 1, 1971 |
| [73] | Assignee | Sony Corporation<br>Tokyo, Japan |

[54] VELOCITY DETECTING APPARATUS EMPLOYING A PAIR OF MODULATION-TYPE MAGNETIC HEADS ON WHICH CARRIERS ARE PHASE MODULATED BY FLUX FROM A MOVING MAGNETIC SCALE
2 Claims, 2 Drawing Figs.

[52] U.S. Cl. .................................................. 324/172, -
340/174.1A, 179/100.2B
[51] Int. Cl. ........................................................ G01p 3/48,
G01p 3/54
[50] Field of Search .......................................... 324/69, 70;
340/263, 271; 317/5; 340/174.1A; 179/100.2 B

[56] References Cited
UNITED STATES PATENTS
2,926,335  2/1960  Bower ........................ 324/70UX
FOREIGN PATENTS
1,053,389  12/1966  Great Britain ................ 324/70

Primary Examiner—Michael J. Lynch
Attorneys—Lewis H. Eslinger and Alvin Sinderbrand ABSTRACT: A velocity detecting apparatus comprises a movable magnetic scale and a pair of modulation-type magnetic heads adjacent the scale and spaced apart along the latter by a distance $(n+¼)$ times the wavelength of a sinusoidal magnetic signal recorded on the scale. Each head receives a sinusoidal carrier signal which is phase modulated in response to the magnetic flux received by the respective head from the moving scale, and the phase-modulated carriers, which are phase-shifted with respect to each other, are mixed to provide a composite phase-modulated signal received by a frequency discriminator to provide an output voltage proportional to the velocity of movement of the scale.

INVENTOR

Saburo Uemura

VELOCITY DETECTING APPARATUS EMPLOYING A PAIR OF MODULATION-TYPE MAGNETIC HEADS ON WHICH CARRIERS ARE PHASE MODULATED BY FLUX FROM A MOVING MAGNETIC SCALE

BACKGROUND OF THE INVENTION

1. Field of the Invention

This invention relates to a velocity detecting apparatus, and more particularly to a velocity detecting apparatus which is convenient for measuring low velocity.

2. Description of the Prior Art

In the field of automatic control a velocity detecting apparatus plays an important role as a control element. The velocity detecting apparatus is generally referred to as a tachometer which is a DC generator provided with a commutator in the DC servosystem and a two-phase induction motor combined with a synchronous detector in the AC servosystem. However, detection of the velocity of straight line motion with the above velocity detecting apparatus necessitates the use of converting means such as a gear or the like for converting the straight line motion into rotary one but this method is defective in that the converting means makes errors. Further, in the case of directly measuring the velocity of the rotary motion, the range of measurable velocity is narrow and errors are likely to occur especially at low-speed rotation, making it difficult to enhance precision in the measurement. In addition, the conventional apparatus has a drawback such as slow response to the variations in velocity.

SUMMARY OF THE INVENTION

This invention has for its object the elimination of the defects encountered in the velocity measurement with the generator. In accordance with this invention velocity of a moving member is detected in the form of the sum of signals induced in two modulation-type magnetic heads by the relative movement of a magnetic scale having reference divisions to the magnetic heads to produce a carrier signal which has been phase-modulated in response to the relative movement of the magnetic scale to the magnetic heads and the phase-modulated carrier signal is frequency-discriminated, thus measuring the velocity of the moving member.

Accordingly, the measurable velocity range of this invention apparatus is enlarged by raising the frequency of the carrier signal supplied to the magnetic heads and the sensitivity of the apparatus can be adjusted by changing the characteristic of the frequency discriminator. Further, since the velocity detecting apparatus of this invention consists of the magnetic scale and the magnetic heads only, the apparatus is simple in construction and is rapid in response to changes in the velocity of the moving member, as compared with the generator machine.

DESCRIPTION OF THE PREFERRED EMBODIMENTS

Figure 1:
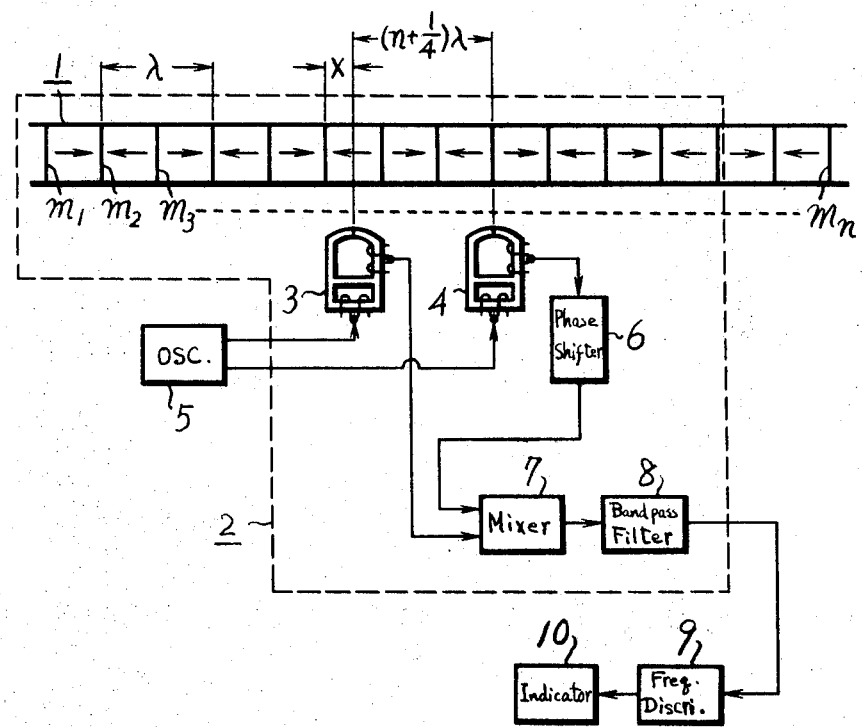
FIG. 1 is a system diagram schematically illustrating one example of the velocity detecting apparatus of this invention.

In FIG. 1 there is illustrated one embodiment of this invention, which comprises a converting unit 2 for producing a carrier signal which is phase-modulated in accordance with the amount of movement or rotation of a moving member and a frequency-discriminator 9 for detecting the phase-modulated output of the converting unit 2. In the illustrated example the converting unit is a magnetic scale converter. Reference numeral 1 indicates a magnetic scale which has reference divisions, commonly called magnetic gratings, which are formed by recording, for example, sinusoidal signals of a certain wavelength $\lambda$ on a magnetic medium such, for example, as a glass plate, a metal strip or the like coated with a magnetic powder. Reference numerals 3 and 4 designate a pair of, for example, modulation-type magnetic heads, which are mounted along the magnetic scale 1 while being spaced apart a distance of approximately $(n+1/4)\lambda$, with $n$ being a positive integer including zero. Reference numeral 5 identifies an oscillator producing a sinusoidal output signal having an angular frequency $\omega_c/2$, which output signal is applied as a carrier signal $\cos(w_c/2)t$ to each of the magnetic heads 3 and 4. When the magnetic head 3 is spaced apart a distance $x$ from a node $m_1, m_2, m_3, \ldots m_n$ of the magnetic signal on magnetic scale 1, electromotive forces resulting from the magnetic flux induced in the magnetic heads 3 and 4 from the magnetic scale 1 are respectively $k_1 \sin(2\pi x/\lambda)$ and $k_2 \cos(2\pi x/\lambda)$ and the carriers supplied to the magnetic heads 3 and 4 are modulated by these electromotive forces to derive modulated outputs from the heads 3 and 4. If the output voltage derived from the magnetic head 3 is taken as $e_1$, it is given by the following equation:

$$e_1 = {}_1\sin(2\pi)^{\cos}\omega_c t \quad (1)$$

where $k_1$ is a proportional constant. While, the output of the magnetic head 4 is fed to a phase shifter 6 to be delayed in phase by $\pi/2$ and if this phase-delayed output voltage of the magnetic head 4 is taken as $e_2$, it is given by the following equation:

$$e_2 = {}_2\cos(2\pi)^{SIN} \omega_c T \quad (2)$$

where $k_2$ is a proportional constant. In this case the carriers fed to the magnetic heads 3 and 4 are $\cos(\omega_c/2)t$ but since the magnetic heads used in the present example are of the magnetic flux-responsive type, the outputs of the heads are amplitude modulations of $\cos \omega_c t$ and $\sin \omega_c t$, respectively as given in the above equations (1) and (2). The output signals $E_1$ and $E_2$ are combined together by a mixer circuit 7 to provide a composite PHASE-modulated signal output $e_3$ through a band-pass filter 8. In this case the signals are added together to the mixer circuit 7. The composite signal $e_3$ is given by the following equation:

$$e_3 = {}_3 \sin(\omega_c t + (2\pi x/\lambda a 8)) \quad (3)$$

where $k_1 = k_2 = k_3$.

In this manner, the magnetic scale converter 2 is constituted.

Although the output of the magnetic head 4 is applied to the mixer circuit 7 through the phase shifter 6 in the foregoing, the output of the head 3 may be applied to the mixer circuit 7 through the phase shifter 6. Alternatively, it is also possible that one of the outputs of the oscillator 5 is shifted in phase by the phase shifter 6 and is applied to the magnetic head 3 or 4.

While magnetic heads 3 and 4 are of the magnetic flux-responsive type, they may be of the modulation type utilizing the Hall effect.

The phase-modulated signal $e_3$ derived from the magnetic scale converter 2 is applied to a frequency-discriminator 9 and a signal thereby detected is indicated by an indicator, for example, a voltmeter 10. It is possible, of course, to convert the output voltage into a digital form for indication. The frequency-discriminator 9 may be any of various types and the linear portion of the characteristic curve of the frequency-discriminator is used. In the equation (3) $x$ is a function of time $t$ and if $(2\pi/\lambda)x = \Phi(t)$, the equation (3) is given as follows: $e_3 = k_3 \sin(\omega_c t + \Phi(t))$ (4)

In the case where the amount of displacement $x$ of the magnetic scale 1 relative to the magnetic head 3 varies at a constant speed with respect to the time $t$, it follows that $$\frac{d}{dt} \cdot \frac{2\pi x(t)}{\lambda} = \frac{d}{dt}\phi(t) = F \quad (5)$$

where F is a constant. $\Phi(t)$ is expressed as follows:
$$\Phi(t) = Ft + \theta_0 \quad (6)$$
where $\theta_0$ is a constant. Accordingly, the equation (4) is rewritten as follows: $e_3 = k_3 \sin\{(\omega_C + )t + \theta\}$ (7)
and the equation (3) representative of the phase-modulated signal is thus rewritten into the equation (7) representative of the frequency-modulated signal. The signal $e_3$ is detected by the frequency discriminator 9 to produce a signal to the indicator 10 in proportion to F. The velocity $v$ of the member to be measured, that is, the magnetic scale 1 mounted there on relative to the magnetic heads 3 and 4 is given by the following equation:

$$v = \frac{F}{2\pi}\lambda \qquad (8)$$

The sensitivity of the velocity detecting apparatus can be adjusted by changing the frequency deviation vs. output voltage characteristic of the frequency discriminator 9.

Figure 2:
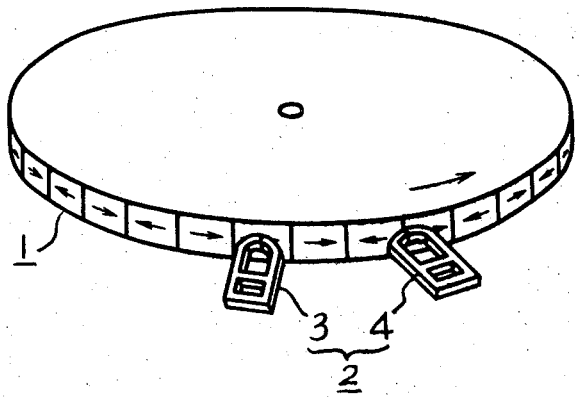
FIG. 2 schematically shows, in perspective, one portion of the apparatus in accordance with another example of this invention.

For detecting the rotational speed of the member to be measured, it is preferred to mount the magnetic scale 1 on the periphery of the member to be measured and to dispose the magnetic heads 3 and 4 in contact with the magnetic scale 1 as illustrated in FIG. 2.

The following examples illustrate numerical values in the case of using the apparatus exemplified in FIG. 2.

EXAMPLE 1

The velocity of a moving member whose maximum number of revolutions was 2 r.p.s. (120 r.p.m.) was measured with a velocity detecting apparatus using a magnetic scale having magnetic gratings of 1,000 cycles for one revolution, with the frequency $\omega_c/2\pi$ of the carriers being selected to be 20 kHz. In this case the frequency deviation ($\pm F/2\pi$ was $\pm 2$ kHz. but the modulation index was 0.1.

EXAMPLE 2

The velocity of a moving member whose maximum number of revolutions was 0.2 r.p.s. (12 r.p.m.) was measured with the use of the same magnetic scale as that in the Example 1, with the frequency of the carriers being selected to be 2 kHz. The frequency deviation was $\pm 0.2$ kHz. but the modulation index was 0.1.

EXAMPLE 3

The velocity of a moving member whose maximum number of revolutions was 100 r.p.s. (6,000 r.p.m.) was measured with a velocity detecting apparatus using a magnetic scale having magnetic gratings of 20 cycles for one revolution, with the carrier frequency being selected to be 20 kHz. The frequency deviation was $\pm 2$ kHz. but the modulation index was 0.1.

As will be seen from the above examples, the present invention enables measurement of a remarkedly small number of revolutions, for example, less than 1 r.p.s. or a remarkedly low speed, as compared with the conventional velocity detecting apparatus employing a generator. Further, the velocity detection is achieved by making use of the modulation of the carriers, so that an increase in the carrier frequency enlarges the frequency range of the signal for modulating the carriers to provide for enlarged measurable velocity range. The moving or revolving speed of the member to be measured can be indicated as positive or negative depending upon the direction of the movement or revolution. In addition, the velocity detecting apparatus of this invention is rapid in response to changes in the velocity of the member to be measured, simple in construction because of nonuse of a motor, and high in precision of the measurement. The sensitivity of the velocity detection is adjustable as previously mentioned. The moving speed of straight line motion can also be directly measured without converting it into rotary motion by, for example, gears or the like.

It will be apparent that many modifications and variations may be effected without departing from the scope of the novel concepts or this invention.

I claim:

1. A velocity detecting apparatus comprising a movable magnetic scale having a magnetic signal thereon of alternately changing polarity at regular intervals in the direction of movement of the scale, a pair of modulation-type magnetic heads disposed fixedly adjacent said scale and being spaced apart along the latter by a distance which is $(n+1/4)$ times the length of said interval between adjacent different polarities of said magnetic signal and in which $n$ is a whole integer, oscillator means generating an AC signal which is applied to each of said modulation-type magnetic heads to provide respective carriers which are modulated by electromotive forces induced in said heads by magnetic flux from said scale to provide a respective phase-modulated carriers as the outputs from said heads, means to shift the phase of one of said outputs with respect to the other of said outputs, mixing circuit means receiving both said one phase-shifted output and the other of said outputs and adding the outputs to provide a composite phase-modulated signal output, frequency discriminating means receiving said composite phase-modulated signal and producing a voltage corresponding to the frequency of said composite phase-modulated signal, and means indicating said voltage as a function of the velocity of movement of said scale.

2. A velocity detecting apparatus according to claim 1, in which said means to shift the phase of one of said head outputs with respect to the other includes phase shifting means interposed between one of said heads and said mixing circuit means.